(12) United States Patent
Takeda et al.

(10) Patent No.: US 7,638,986 B2
(45) Date of Patent: Dec. 29, 2009

(54) CONTROL SYSTEM FOR STATIC VAR COMPENSATOR

(75) Inventors: Masatoshi Takeda, Tokyo (JP); Koji Temma, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 5 days.

(21) Appl. No.: 11/756,681

(22) Filed: Jun. 1, 2007

(65) Prior Publication Data

US 2008/0001581 A1 Jan. 3, 2008

(30) Foreign Application Priority Data

Jun. 28, 2006 (JP) ............................. 2006-178153

(51) Int. Cl.
*G05F 1/70* (2006.01)
*H02M 7/04* (2006.01)
*H02J 3/24* (2006.01)

(52) U.S. Cl. ..................... 323/210; 363/96; 307/102

(58) Field of Classification Search ............... 323/205, 323/208–211; 363/39, 45, 46, 54, 57, 21.08, 363/21.16, 128, 135, 158, 160, 11, 27, 53, 363/94, 85, 96; 307/98, 99, 102
See application file for complete search history.

(56) References Cited

U.S. PATENT DOCUMENTS 3,963,978 A * 6/1976 Kelley et al. ............... 323/210
4,686,447 A * 8/1987 Takeda et al. ............... 323/210
4,755,738 A * 7/1988 Shimamura et al. ......... 323/210
5,969,509 A * 10/1999 Thorvaldsson ............. 323/210

FOREIGN PATENT DOCUMENTS

JP 61-221533 A 10/1986

OTHER PUBLICATIONS

R. Mohan Mathur et al., "Thyristor-Based Facts Controllers for Electrical Transmission Systems," 2002, pp. 47-55, and 214, IEEE Press.

* cited by examiner

*Primary Examiner*—Jessica Han
*Assistant Examiner*—Emily Pham
(74) *Attorney, Agent, or Firm*—Buchanan Ingersoll & Rooney PC

(57) ABSTRACT

In a control system for a static var compensator that performs phase control of a current of a reactor for each phase by a thyristor and thus controls reactive power, a detecting unit that detects a tertiary harmonic current flowing through each phase of the static var compensator is provided, and on the basis of the tertiary harmonic current flowing through each phase detected by the detecting unit, the thyristor of each phase is controlled so that the quantity of generated tertiary harmonic current of each phase becomes equal, and therefore an outflow of the tertiary harmonic current toward a system can be restrained by an inexpensive method.

4 Claims, 3 Drawing Sheets

CONTROL SYSTEM FOR STATIC VAR COMPENSATOR

BACKGROUND OF THE INVENTION

1. Field of the Invention

This invention relates to a control system for a static var compensator adapted for performing phase control of a current of a reactor for each phase by a thyristor and thus controlling reactive power.

2. Description of the Related Art

It has been known that, in a static var compensator (hereinafter referred to simply as "SVC") that performs phase control of a reactor current for each phase by a thyristor and thus controls reactive power, a harmonic current is generated when the magnitude of a reactor current is phase-controlled by a thyristor converter. For example, R. Mohan Mathur and Rajiv K. Varma, "Thyristor-based FACTS controller for electrical transmission systems", published by Wiley-Interscience, 2002, p. 47-55, FIG. 3.9 shows the generation of a harmonic current. Since a tertiary harmonic current generated from TCR (thyristor controlled reactor) is large, outflow of the tertiary harmonic current toward the system is restrained by delta-connecting the TCR, as shown in FIG. 3.11 of R. Mohan Mathur and Rajiv K. Varma.

When the power system voltage is in a three-phase balanced state, the tertiary harmonic current is canceled by the delta connection and hardly flows out toward the system. However, when the system voltage includes a three-phase unbalanced component, the tertiary harmonic current is not canceled and flows out toward the system. When the power system has a resonance characteristic near the tertiary level, the tertiary harmonic current flowing out from the TCR expands the tertiary harmonic voltage distortion of the system. This causes problems of obstruction to sound operations of the SVC and adverse effects on the other devices connected to the system.

To deal with such cases, traditionally, in the example disclosed in R. Mohan Mathur and Rajiv K. Varma, a tertiary harmonic filter is connected parallel to the TCR to absorb the outflowing tertiary harmonic current.

R. Mohan Mathur and Rajiv K. Varma, and JP-A-61-221533 (FIG. 1 and its description) also disclose techniques for controlling the current of each phase of the TCR in order to equalize the magnitude of fundamental wave currents of the respective phases of the TCR (in JP-A-61-221533, it is described as SVC instead of TCR). However, JP-A-61-221533, and R. Mohan Mathur and Rajiv K. Varma disclose that simply equalizing the magnitude of the fundamental wave currents is not effective and may conversely expand the tertiary harmonic current. This is because the quantity of the fundamental wave current and generated tertiary harmonic current of the SVC has a nonlinear characteristic as shown in FIG. 4 and the polarity of a tertiary harmonic generation sensitivity coefficient K3 with respect to changes in $\alpha$ is reversed at a certain phase angle $\alpha 0$, thereby destabilizing the control.

In the traditional SVC, since the tertiary harmonic current flows out toward the system when the system voltage is unbalanced, there is a problem that the tertiary harmonic voltages is distorted and adversely affects the other devices connected to the system. Also, since the tertiary harmonic filter must be provided, there is a problem of increase in cost.

There is still another problem that if the currents of the three phases are controlled to be equal in order to restrain the tertiary harmonic current, the control becomes unstable and conversely expands the tertiary harmonic.

SUMMARY OF THE INVENTION

In view of the foregoing circumstances, it is an object of the present invention to restrain the outflow of the tertiary harmonic current toward the system by an inexpensive system.

According to an aspect of the invention, in a control system for a static var compensator that performs phase control of a current of a reactor for each phase by a thyristor and thus controls reactive power, the thyristor of each phase is controlled so that the quantity of generated tertiary harmonic current of each phase in the static var compensator becomes equal. According to the invention, the outflow of the tertiary harmonic current toward the system can be restrained by an inexpensive system.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
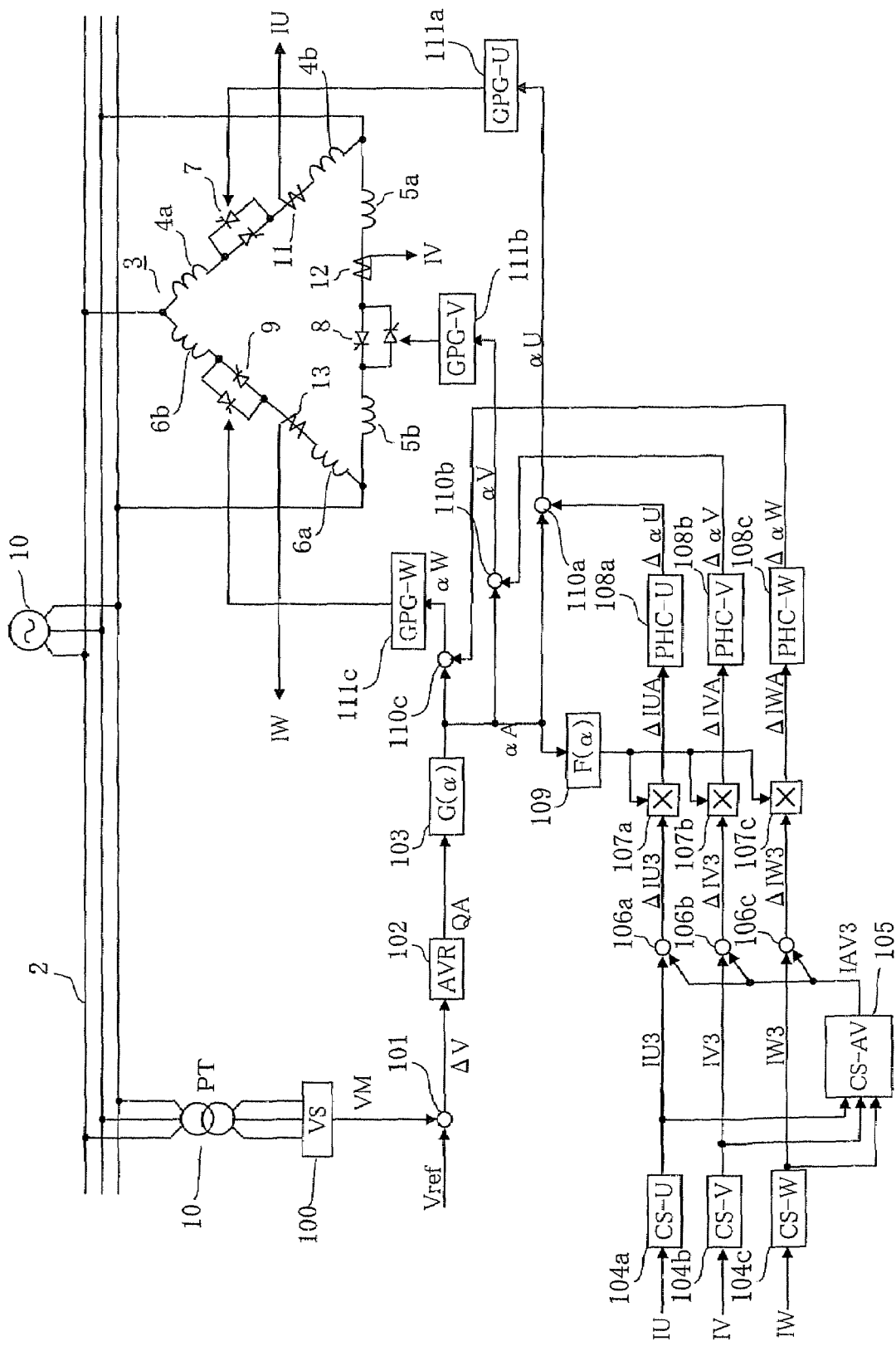
FIG. 1 is a block diagram showing an exemplary configuration of a power system in which an exemplary SVC is installed and an exemplary tertiary harmonic restraining and control circuit according to Embodiment 1 of the invention.
Figure 2:
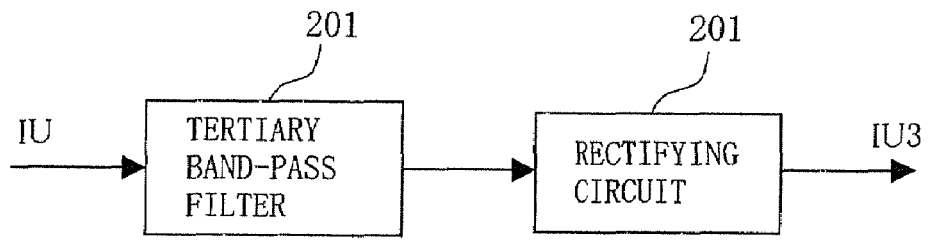
FIG. 2 is a circuit diagram showing an exemplary detection unit for detecting the quantity of a tertiary harmonic current flowing through the SVC according to Embodiment 1 of the invention.
Figure 3:
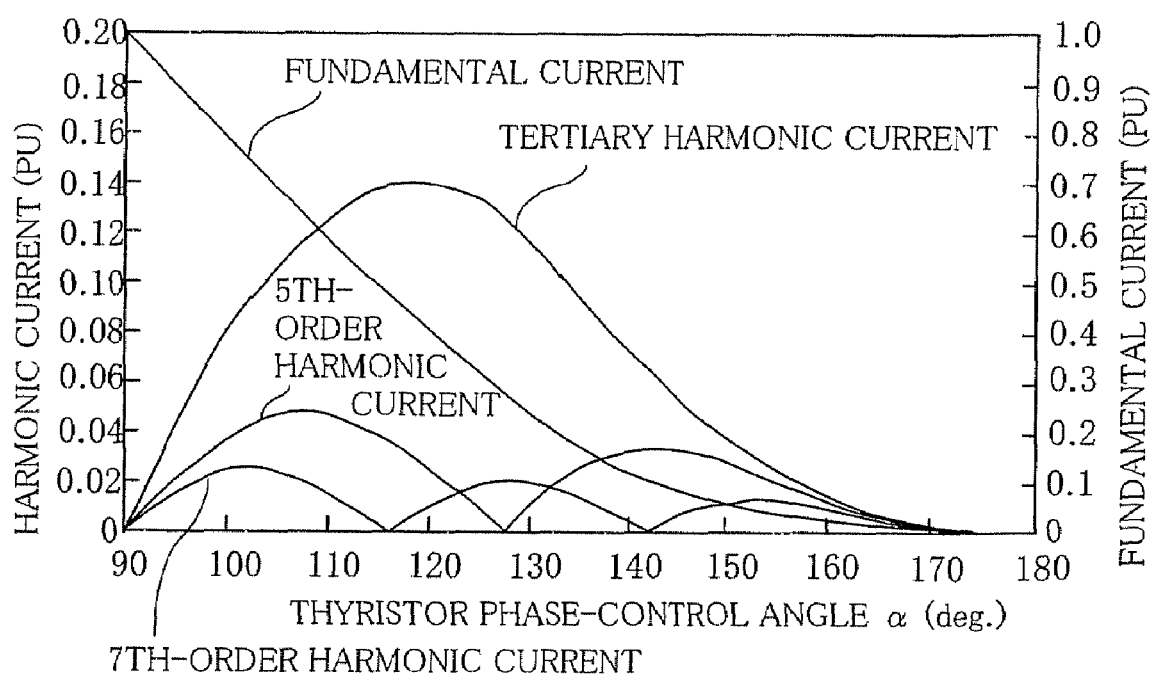
FIG. 3 is a graph showing an exemplary relation between the quantity of generated tertiary harmonic current in the SVC and the thyristor phase-control angle according to Embodiment 1 of the invention.
Figure 4:
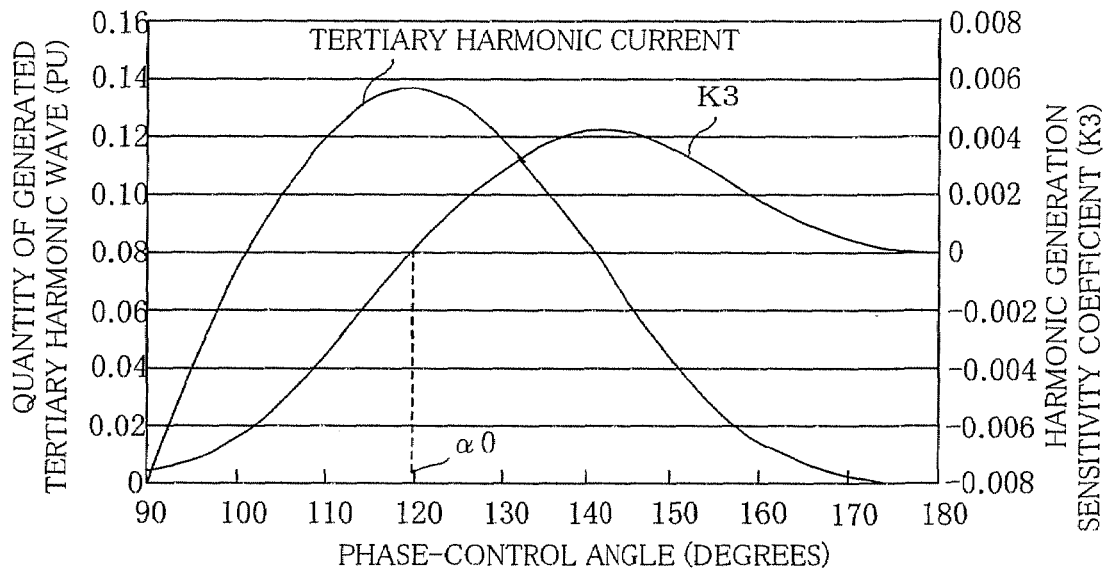
FIG. 4 is a graph showing an exemplary sensitivity coefficient that represents a change in the quantity of the tertiary harmonic current in the SVC with respect to a change in a thyristor phase-control angle $\alpha$ according to Embodiment 1 of the invention.
Figure 5:
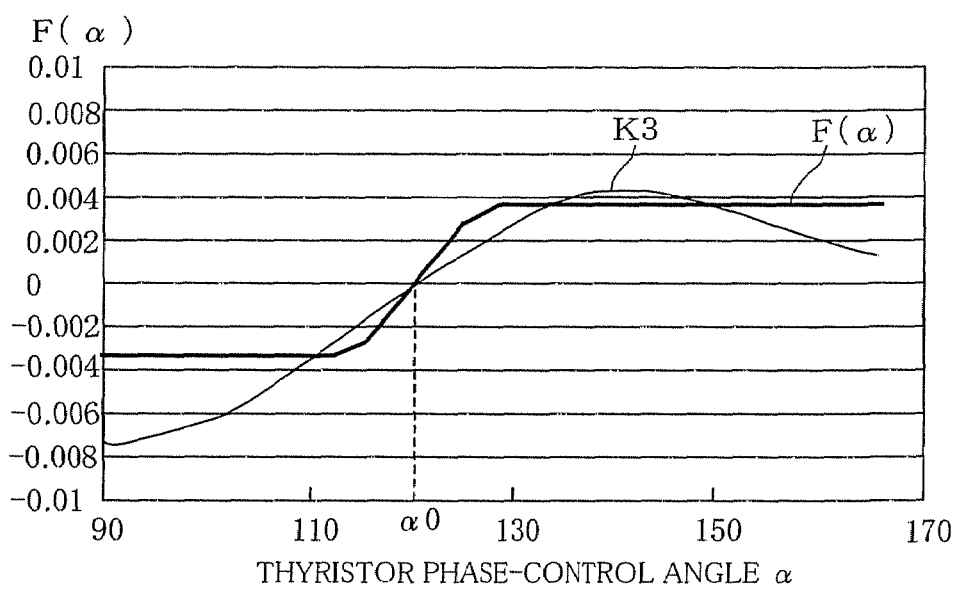
FIG. 5 is a graph showing an exemplary linearization function for linearizing the nonlinear relation of the sensitivity coefficient shown in FIG. 4, according to Embodiment 1 of the invention.

Hereinafter, Embodiment 1 of the invention will be described with reference to FIGS. 1 to 5. FIG. 1 is a block diagram showing an exemplary configuration of a power system in which an exemplary SVC is installed and an exemplary tertiary harmonic restraining and control circuit. FIG. 2 is a circuit diagram showing an exemplary detection unit for detecting the quantity of a tertiary harmonic current flowing through the SVC. FIG. 3 is a graph showing an exemplary relation between the quantity of generated tertiary harmonic current in the SVC and the thyristor phase-control angle. FIG. 4 is a graph showing an exemplary sensitivity coefficient that represents a change in the quantity of the tertiary harmonic current in the SVC with respect to a change in a thyristor phase-control angle $\alpha$. FIG. 5 is a graph showing an exemplary linearization function for linearizing the nonlinear relation of the sensitivity coefficient shown in FIG. 4. In the drawings, the same numerals represent the same parts.

Embodiment 1 of the invention relates to a method for restraining and controlling a tertiary harmonic current generated in a TCR-based static var compensator (SVC) in which the magnitude of a reactor current is phase-controlled by a thyristor converter, thereby adjusting the magnitude of reactive power. It also describes an exemplary control method for a static var compensator that can minimizes a tertiary harmonic current flowing out from the SVC toward a power system because of three-phase unbalanced voltage components existing in the power system when the SVC is connected to the power system. It also describes a control method for a static var compensator that can operate stably by restraining a tertiary harmonic current flowing out from the SVC toward a power system is restrained, and by detecting a tertiary harmonic current component that flows through each phase of the SVC, correcting the phase-control angle of a thyristor converter for each phase of the SVC to reduce the unbalance in the detected tertiary harmonic current between the respective phases and thus restraining the outflow of the tertiary harmonic current toward the system, and by introducing a control circuit that corrects a nonlinear relation between the quantity of generated tertiary harmonic and the phase-control angle of the SVC.

The detailed description will follow.

In FIG. 1, an SVC 3 is connected to a substation bus 2 connected to a three-phase power system 1. The SVC 3 is formed by delta-connecting main circuit elements including reactors 4, 5, 6 and thyristor converters 7, 8, 9 that are connected in series.

A PT 10 that measures a bus voltage is connected to the bus 2.

A voltage signal of the bus 2 measured by the PT is inputted to a voltage sensor (VS) 100 of an SVC control unit, converted to a three-phase voltage r.m.s. value, and taken in the SVC control unit as a voltage signal VM.

In a subtraction circuit 101, the voltage signal VM is subtracted from a voltage reference value (Vref) preset by a control circuit, and the difference $\Delta V$ (=Vref−VM) is inputted to an AVR circuit 102 on the next stage.

This AVR circuit 102 is formed by a composite circuit of proportional control and integral control and serves to perform feedback control of the quantity of reactive power flowing through the SVC so that the voltage difference $\Delta V$ is constantly close to 0.

An output QA of this AVR circuit 102 is inputted to a phase-control angle calculating circuit (G$\alpha$) 103 on the next stage, which calculates a thyristor phase-control angle $\alpha$ of the SVC for getting a required quantity of reactive power.

In this calculation, a thyristor phase-control angle $\alpha$ that is necessary for outputting a desired quantity of reactive power is calculated, for example, in accordance with the equation (13.8) of R. Mohan Mathur and Rajiv K. Varma. This value $\alpha$ is the same and common among the three phases.

Meanwhile, currents IU, IV, IW flowing through the respective phases of the delta-connected SVC 3 are detected by CT 11, 12, 13, and the magnitudes of tertiary harmonic currents of the respective phases are calculated by a current sensor (CS-U) 104a, a current sensor (CS-V) 104b and a current sensor (CS-W) 104c.

As these current sensors, for example, a circuit shown in FIG. 2 is used. In FIG. 2, the current IU of the U-phase is inputted to a band-pass filter 201 tuned to the tertiary level, and only the tertiary current is extracted. As the extracted tertiary current is rectified by a rectifying circuit 202, a voltage output (IU3) proportional to the magnitude of the tertiary harmonic current is produced. The similar construction applies to the V-phase and W-phase.

In the example shown in this embodiment, the SVC 3 includes a first series circuit formed by reactors 4a, 4b and the thyristor converter 7, a second series circuit formed by reactors 5a, 5b and the thyristor converter 8, and a third series circuit formed by reactors 6a, 6b and the thyristor converter 9. The first series circuit, the second series circuit and the third series circuit are delta-connected.

These tertiary current detection values IU3, IV3, IW3 are inputted to an average value circuit (CS-AV) 105, which calculates an average value of the three phases, that is, an average value IAV3.

Current difference calculating circuits (combining circuits) 106a, 106b, 106c calculate the difference between the tertiary harmonic current values IU3, IV3, IW3 of the respective phases and the average harmonic current value IAV3 in accordance with the following equations.

$\Delta IU3 = IU3 - IAV3$ $\Delta IV3 = IV3 - IAV3$ $\Delta IW3 = IW3 - IAV3$

The relation between the tertiary harmonic current generated by the SVC 3 and the thyristor phase-control angle $\alpha$ is as shown in FIG. 3. The following relations hold.

During a period when $\alpha < \alpha 0$ holds, the tertiary harmonic current increases as $\alpha$ increases.

During a period when $\alpha > \alpha 0$ holds, the tertiary harmonic current decreases as $\alpha$ increases.

From FIG. 3, a sensitivity coefficient K3 that represents a change in the quantity of the generated tertiary harmonic with respect to a change in the thyristor phase-control angel $\alpha$ is found and it is shown in FIG. 4. However, K3=d(I3)/d ($\alpha$) holds, where I3 represents an r.m.s. value of the tertiary harmonic current.

As is clear from FIG. 4, the sensitivity coefficient K3 that represents a change in the quantity of the generated harmonic with respect to a change in the thyristor phase-control angle $\alpha$ is nonlinear, and its polarity is reversed at $\alpha 0$. Therefore, the characteristic of K3 must be linearized to accurately control $\alpha$ in order to correct the phase angle of each phase and equalize the magnitudes of the tertiary harmonic currents of the three phases.

To this end, the tertiary harmonic difference signals $\Delta IU3$, $\Delta IV3$, $\Delta IW3$ are inputted to multiplying circuits 107a, 107b, 107c to calculate the following equations.

$\Delta IUA = F(\alpha)^* \Delta IU3$ $\Delta IVA = F(\alpha)^* \Delta IV3$ $\Delta IWA = F(\alpha)^* \Delta IW3$ $F(\alpha)$ is a linearization function to linearize the sensitivity coefficient K3 shown in FIG. 4. In this example, the function shown in FIG. 5 is used as an approximate value.

The current difference signals $\Delta IUA$, $\Delta IVA$, $\Delta IWA$ are inputted to correction angle calculating circuits (PHC-U, PHC-V, PHC-W) 108a, 108b, 108c, which output phase-control angle correction signals $\Delta \alpha U$, $\Delta \alpha V$, $\Delta \alpha W$. These correction angle calculating circuits include a combination of a proportional control function and an integral control function, and serve to correct the thyristor phase-control angle of each phase by feedback control so that $\Delta IUA$, $\Delta IVA$, $\Delta IWA$ become closer to 0.

The phase-control angle correction signals $\Delta \alpha U$, $\Delta \alpha V$, $\Delta \alpha W$ are inputted to combining circuits 110a, 110b, 110c to correct the phase-control angles of the respective phases by using the following equations. Thus, thyristor phase-control angles $\alpha U$, $\alpha V$, $\alpha W$ for the respective phases are acquired.

$$\alpha U = \alpha A + \Delta \alpha U$$

$$\alpha V = \alpha A + \Delta \alpha V$$

$$\alpha W = \alpha A + \Delta \alpha W$$

In these equations, αA is the thyristor phase-control angle that is common among the respective phases, acquired by the equation (3.8) of R. Mohan Mathur and Rajiv K. Varma.

The thyristor phase-control angles αU, αV, αW acquired by the above equations are inputted to gate pulse generating circuits (GPG-U, GPG-V, GPG-W) 111*a*, 111*b*, 111*c* on the next stage, which provide gate pulses corresponding to the thyristor phase-control angles αU, αV, αW to the thyristor converters 7, 8, 9, thus controlling the thyristor converters for each phase.

In such a configuration, when an unbalanced voltage exists on the bus 2, the SVC performs control to equalize the magnitudes of the tertiary harmonic currents of the three phases generated at the time of thyristor control. These tertiary harmonic currents are offset within the delta connection of the SVC and the tertiary harmonic current flowing out toward the system are restrained. Also, as the linearization function F(α) is introduced into the control, the instability of control can be eliminated and stable control can be made.

In this manner, according to Embodiment 1 of the invention, even when the voltage on the bus 2 has an unbalanced component, the tertiary harmonic current flowing out of the SVC 3 toward the system can be minimized. The voltage distortion of the power system can be reduced and the tertiary harmonic filter is no longer necessary.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control system for a static var compensator that performs phase control of a current of a reactor for each phase by a thyristor and thus controls reactive power, the system comprising a control circuit controlling the thyristor of each phase based on a change in the quantity of generated tertiary harmonic with respect to a change in the thyristor phase control angle so that the quantity of generated tertiary harmonic current of each phase in the static var compensator becomes equal.

2. The control system for a static var compensator according to claim 1, wherein a detecting unit that detects a tertiary harmonic current flowing through each phase of the static var compensator is provided, and on the basis of the tertiary harmonic current flowing through each phase detected by the detecting unit, the thyristor of each phase is controlled so that the quantity of generated tertiary harmonic current of each phase becomes equal.

3. The control system for a static var compensator according to claim 1, wherein a nonlinear relation between a phase-control angle of the thyristor and the quantity of generated tertiary harmonic current is corrected by a correcting unit.

4. The control system for a static var compensator according to claim 2, wherein a nonlinear relation between a phase-control angle of the thyristor and the quantity of generated tertiary harmonic current is corrected by a correcting unit.

* * * * *